United States Patent Office 3,412,693
Patented Nov. 26, 1968

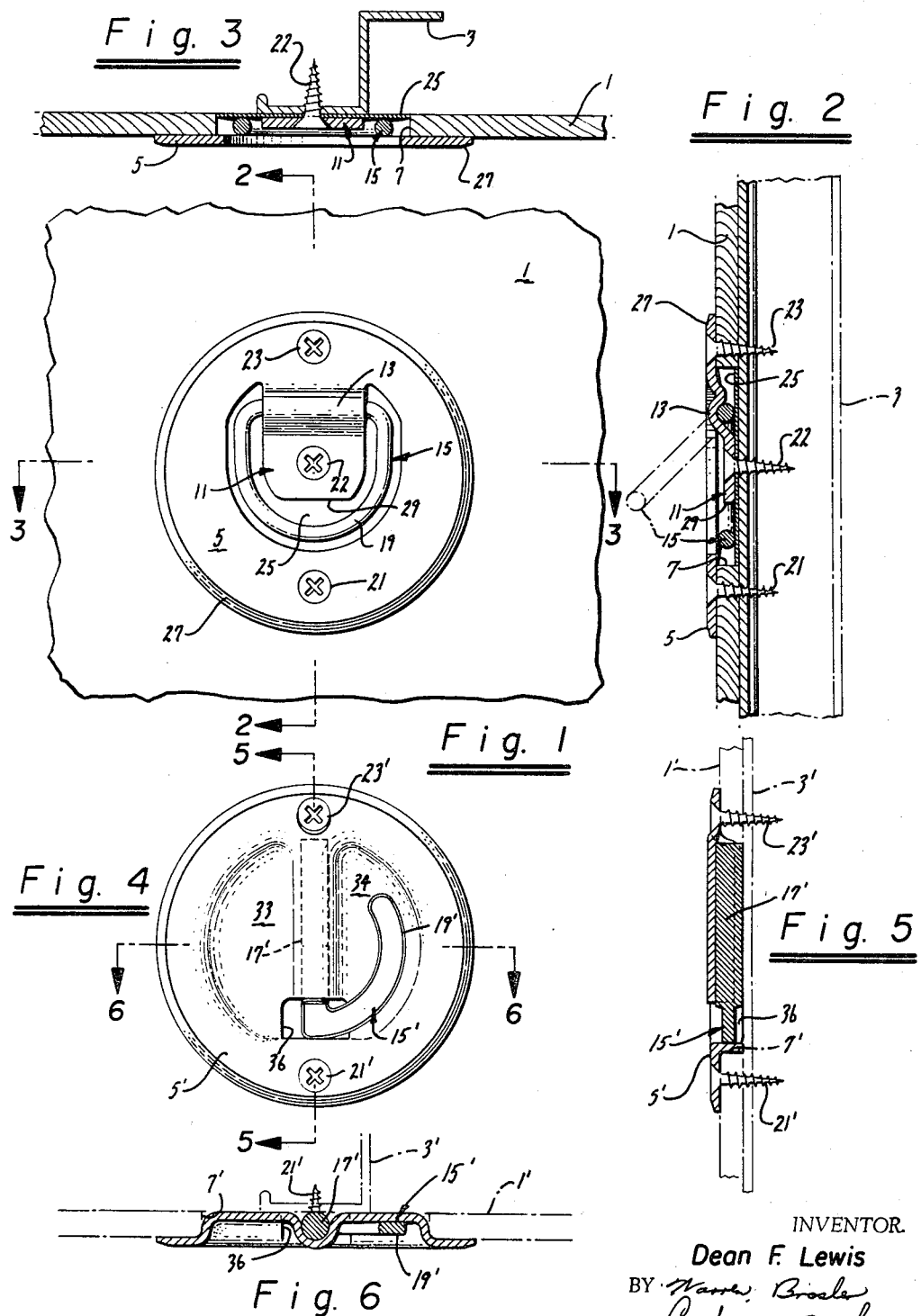

3,412,693
CARGO ANCHORING DEVICE
Dean F. Lewis, Lafayette, Calif.
(4444 Piedmont Ave., Oakland, Calif. 94611)
Filed May 31, 1967, Ser. No. 642,391
4 Claims. (Cl. 105—369)

ABSTRACT OF THE DISCLOSURE

A cargo anchoring device consisting of a housing having a flange encircling and partially covering a recess in a wall of a cargo vehicle, a tongue projecting radially inwardly from the flange formed with a U-shaped portion in which pivots a tie member.

Background of the invention

This invention pertains to cargo anchoring devices and in particular to anchors used in cargo trucks and trailers. Most trucks and trailer side walls are constructed using one-quarter inch plywood. These thin walls are often backed by Z-posts. The most economical way of attaching the anchors is to drill circular holes in the plywood and attach them directly to the Z-posts. Although a thin flange projecting beyond the plywood is not objectionable, the tie member should not protrude. In order to construct the tie member as strong as possible, a special housing is required. Anchors presently available are too great in thickness and are suitable only for three-eighths inch walls or must be connected to special offset or backup plates connected to the posts. This is unnecessarily expensive.

Summary of the invention

The gist of the invention is the use of a housing for the tie member that utilizes the post of the trailer to form an integral part of the anchor; namely to hold the pivotally mounted tie member thereby reducing the total thickness of the device.

An object of the invention is to provide a stronger yet less expensive flush mounted anchor in which the tie member does not protrude beyond the wall of the vehicle when not performing its anchoring function. Another object is to provide an anchor which has a minimum number of parts, is easily assembled, requires no auxiliary plates and has a long trouble-free life.

Still another object is to provide a cargo ring which requires no welding and actually can be sold as separate components and assembled by the manufacturer assembling the truck or trailer van.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Brief description of the drawing

FIGURE 1 is a side elevation view of a portion of the wall of a cargo vehicle showing the cargo anchoring device of the present invention mounted therein.

FIGURE 2 is a cross-sectional view of the anchor taken substantially along the line 2—2 of FIGURE 1 and showing a portion of the device in phantom for purposes of illustration.

FIGURE 3 is a cross-sectional view of a Z-post of a trailer and of the device taken substantially along the line 3—3 of FIGURE 1.

FIGURE 4 is a side elevational view of an alternate form of the device shown in FIGURE 1.

FIGURE 5 is a cross-sectional view of the device shown in FIGURE 4 taken substantially along the line 5—5.

FIGURE 6 is a cross-sectional view of the device shown in FIGURE 4 taken substantially along the line 6—6.

Description of the preferred embodiments

The cargo anchoring device of the present invention for cargo vehicles having side walls 1 and frame members as illustrated by number 3 consists briefly of a housing having a flange 5 adapted to engage the portion of the wall surrounding a recess 7 formed in the wall and to cover a peripheral annular portion of the recess, the housing being formed with a tongue 11 projecting radially inwardly on the flange and formed with an elongated U-shaped portion 13 opening to the recess, a tie member 15 having an elongated portion 17 substantially circular in cross-section positioned for registration and rotation between the U-shaped portion and the frame member and having a diameter substantially equal to the depth of the recess, the tie member having a curved portion 19 integral with and angularly related to the elongated portion for receiving cargo tie members, and the curved portion of the tie member having a cross-sectional diameter substantially equal to the depth of the recess and being formed for receipt of the recess between the flange and the tongue in a first position and movable to a second position protruding beyond the flange.

The entire housing can be punched from cold rolled steel by a compound die punch in one short stroke. In the preferred embodiment for use with one-quarter inch thick plywood the material may be 13 gauge with cadmium, PVC or other finish. An outside diameter of 3⅞ inches has been found suitable. The tie member here shown is a steel wire resistance welded and plated and for a one-quarter inch wall installation a 7/32 diameter steel is preferable. The anchor is fastened to the post 3 by means of three screws 21, 22 and 23. Note that screw 22 holds the tongue firmly in place so that the force exerted on the tie member 15 falls generally midway between the fasteners 22 and 23.

In a preferred embodiment the housing is formed with a U-shaped opening between the flange and the tongue for receiving the tie member. Where the post or frame 3 is not as wide as the recess, a dust cover plate 25 may be placed between the frame and the wall for sealing out dust. The dust cover plate may be made of any thin material such as 26 gauge aluminum.

To prevent catching of the cargo on the housing the peripheral edge may be chamfered as at 27.

The tongue is dimensioned so that there is space for the tie member to rest between the tongue and the flange. The tongue, however, has a width so that the tie member does not slide transversely so as to rest behind a portion of the flange and thereby make it difficult to pivot the ring from its rest position. Another factor in enabling convenient use of the ring is to construct the tongue so that it is short enough to permit a person to place his finger between the distal end 29 of the tongue and the lower end 31 of the ring.

Referring to the alternate form of the invention shown in FIGURES 4, 5 and 6, the cargo anchoring device for a cargo vehicle having side walls 1' and frame members 3' consist briefly of a housing having a flange 5' adapted to engage the portion of the wall surrounding a recess 7' formed in the wall and to cover a peripheral annular portion of the recess, the housing being formed with a tongue 11' projecting radially inwardly from the flange and formed with an elongated U-shaped portion opening to the recess, a tie member 15' having an elongated portion 17' substantially circular in cross section positioned for registration and rotation between the U-shaped portion and the frame member and having a diameter substantially equal to the depth of the recess, the tie member having a curved portion 19' integral with and angularly related to the elongated portion for receiving cargo tie members, the curved portion of the tie member having a cross-sectional diameter substantially equal to the depth of the recess and being formed for receipt in the recess between the flange and the tongue in a first position and movable to a second position protruding beyond the flange. The housing is formed with recessed web portions 33 and 34 joining the flange and the tongue and is formed with an opening 36 at the distal end of the tongue for receiving the curved portion of the tie member. The U-shaped portion is positioned with its longitudinal axis parallel to the longitudinal axis of the tongue so as to receive the elongated portion 17' of the tie member and permit the curved portion 19' to either rest in recess 33 or 34.

The alternate form shown in FIGURE 4 which is characterized by a J-shaped tie member is secured to the post by two fasteners 21' and 23'.

The anchor may be installed by drilling a center hole in the plywood and the post. A circular hole of about 2½ inches in diameter is then cut in the plywood with a hole saw. If a dust shield is used it is then placed against the post. The tie member is then set against the dust member or the post and the housing then placed over the tie member so that the elongated portion of the tie member is in registration with the U-shaped portion of the housing tongue. The fastening screws are then placed in the housing and tightened against the post and wall.

In use, the tie member will normally rest in the recess in a first position so that it does not protrude from the wall or housing. When cargo is to be tied down, the tie member may be easily pivoted about its elongated portion so that it protrudes from the wall and a tie rope or band can easily be affixed to the tie member.

I claim:

1. A cargo anchoring device for a cargo vehicle having side walls and frame members comprising:

a housing having a flange adapted to engage the portion of said wall surrounding a recess formed in said wall and to cover a peripheral annular portion of said recess;

said housing being formed with a tongue projecting radially inwardly from said flange and formed with an elongated U-shaped portion opening to said recess;

a tie member having an elongated portion substantially circular in cross section positioned for registration and rotation between said U-shaped portion and said frame member and having a diameter substantially equal to the depth of said recess;

said tie member having a curved portion integral with and angularly related to said elongated portion for receiving cargo tie members; and said curved portion of said tie member having a cross sectional diameter substantially equal to the depth of said recess and being formed for receipt in said recess between said flange and said tongue in a first position and movable to a second position protruding beyond said flange.

2. A cargo anchoring device as described in claim 1 comprising:

said housing being formed with a U-shaped opening between said flange and said tongue, for receiving the curved portion of said tie member in said first position;

a dust cover plate dimensioned for registration in said recess for sealing said wall and being positioned between said frame and said wall; and means joining said dust cover and said housing.

3. A cargo anchoring device as described in claim 1 including:

a first means fastening said flange to said support; and
   second means fastening the distal end of said tongue to said support.

4. A cargo anchoring device as described in claim 1 wherein:

said housing is formed with a recessed web portion joining said flange and said tongue and is formed with an opening at the distal end of said tongue for receiving the curved portion of said tie member; and said U-shaped portion positioned with its longitudinal axis parallel to the longitudinal axis of said tongue.

References Cited

UNITED STATES PATENTS

| 2,587,882 | 3/1952 | Oakley | 105—369 |
| 2,702,513 | 2/1955 | Tuttle | 105—369 |
| 2,856,865 | 10/1958 | Reynolds | 105—369 |
| 3,021,799 | 2/1962 | Oakley | 105—369 |

DRAYTON E. HOFFMAN, *Primary Examiner.*